United States Patent [19]

Stikeleather et al.

[11] 4,342,186

[45] Aug. 3, 1982

[54] RESONANT SICKLE DRIVE

[75] Inventors: Larry F. Stikeleather, Hales Corners; Tony L. Kaminski, Greendale, both of Wis.

[73] Assignee: Allis-Chalmers Corporation, Milwaukee, Wis.

[21] Appl. No.: 186,571

[22] Filed: Sep. 12, 1980

[51] Int. Cl.³ ............................................. A01D 55/02
[52] U.S. Cl. ........................................ 56/257; 56/306; 56/299
[58] Field of Search ................. 56/296, 299, 306, 257, 56/258, 259, 260, 261, 262, 263; 74/60, 100

[56] References Cited

U.S. PATENT DOCUMENTS

| 2,118,792 | 5/1938 | Horton | 74/100 |
| 3,463,018 | 8/1969 | Hale et al. | 74/60 |
| 3,763,639 | 10/1973 | Grillot | 74/60 |
| 3,823,534 | 7/1974 | Bornzin et al. | 56/296 |
| 3,996,806 | 12/1976 | Alexander | 74/60 |

OTHER PUBLICATIONS

"Ingenious Mechanisms for Designers & Inventors", vol. II, p. 382, FIG. 11, 1957.

Primary Examiner—Robert A. Hafer
Attorney, Agent, or Firm—Charles L. Schwab

[57] ABSTRACT

Resonant frequency operation of a reciprocating sickle (28) of a mowing device is achieved by connecting a torsion bar (97) to its actuating lever (82). The torsion bar (97) spring rate is such that when installed in a sickle and drive system, the resonant frequency of the sickle and its drive falls within the range of frequencies at which the sickle is reciprocated during crop cutting operations.

15 Claims, 6 Drawing Figures

RESONANT SICKLE DRIVE

FIELD OF THE INVENTION

This invention relates to crop cutting or mowing devices and more particularly to a mechanism for driving a reciprocating cutter or sickle bar at relative high speeds.

BACKGROUND OF THE INVENTION

There has been a trend over the past several years to provide agricultural combines of greater threshing capacity. While the size of combines has been increased over earlier designs, there is a practical limit to physical increases in header size.

The productivity of large capacity combines may be increased by operating at a higher ground speed, which requires a higher cutter speed. In the case of a reciprocating sickle type cutter, the inertia related forces in the cutter mechanism increases with the square of the frequency of reciprocation. The present invention is directed to providing a cutting mechanism which operates at high speed without imposing unduly high forces on its drive mechanism. This is achieved by provision of a spring coupled cutting mechanism whose resonant frequency is within the reciprocating frequency range at which the sickle is normally operated for crop cutting purposes. Operating the spring coupled sickle bar, at its drive near resonant frequency, results in a greatly reduced input torque requirement, thus conserving power and energy. Also, the lower forces are expected to result in longer operating life of drive components. It is a more specific object of the invention to provide a wobble drive and torsion bar assembly in a sickle drive which operates near its resonant frequency when the sickle bar is reciprocated at its desired crop cutting frequency.

Heretofore others have suggested the use of wobble drive mechanisms for reciprocating the cutter bar of a mowing device, as shown and described in U.S. Pat. Nos. 3,397,584; 3,444,676 and 3,463,018. Also, heretofore others have suggested the use of resilient spring devices for storing and releasing energy during reciprocation of a sickle bar. Several such arrangements are shown in U.S. Pat. Nos. 14,046; 280,901; 280,902 and 1,078,101.

BRIEF DESCRIPTION OF THE INVENTION

A torsion spring with predetermined spring rate is connected to an oscillating member or lever which in turn is connected to a reciprocating sickle bar of a harvester. The torsion spring is especially selected or designed, so when it is installed in the sickle bar drive system, the reciprocating and oscillating assembly will be operating near a resonant frequency when the sickle bar is reciprocated at its normal crop cutting frequency. The sickle drive mechanism may include a lever pivotally connected to a support for oscillation about an axis transverse to the direction of operation of the sickle to which an end thereof is connected. An intermediate portion of the lever is connected to one end of a torsion bar, which has its other end secured to the support. In order to permit the same size torsion bar and drive mechanism to be used to drive sickles of different lengths, provision may be made for detachably connecting a counterweight on the end of the lever remote from its connection with the sickle bar, the selected counterweight mass may vary with the length of the sickle bar.

The torsion spring may be in the form of an elongated torsion bar in alignment with the axis of oscillation of the sickle operating lever. Preferably the torsion bar has zero stored energy at the midpoint of reciprocation of the sickle bar and stores energy as the sickle bar moves in either direction to the end of its stroke. The torsion bar releases its energy to the sickle bar as the sickle bar moves from the end of its stroke to the midpoint of its stroke.

The lever may include a U-shaped member with its bridging portion rigidly secured to the torsion bar and the drive mechanism may include a wobble drive mechanism having its trunnion ring drivingly connected to the legs of the U-shaped member; the trunnion ring being journalled on a canted portion of the wobble drive mechanism drive shaft.

A tube may be mounted on the harvester in encompassing relation to the torsion bar with one end rigidly secured to one end of the torsion bar. The tube also protects the torsion bar against accidental damage.

DETAILED DESCRIPTION OF THE DRAWINGS

Figure 1:
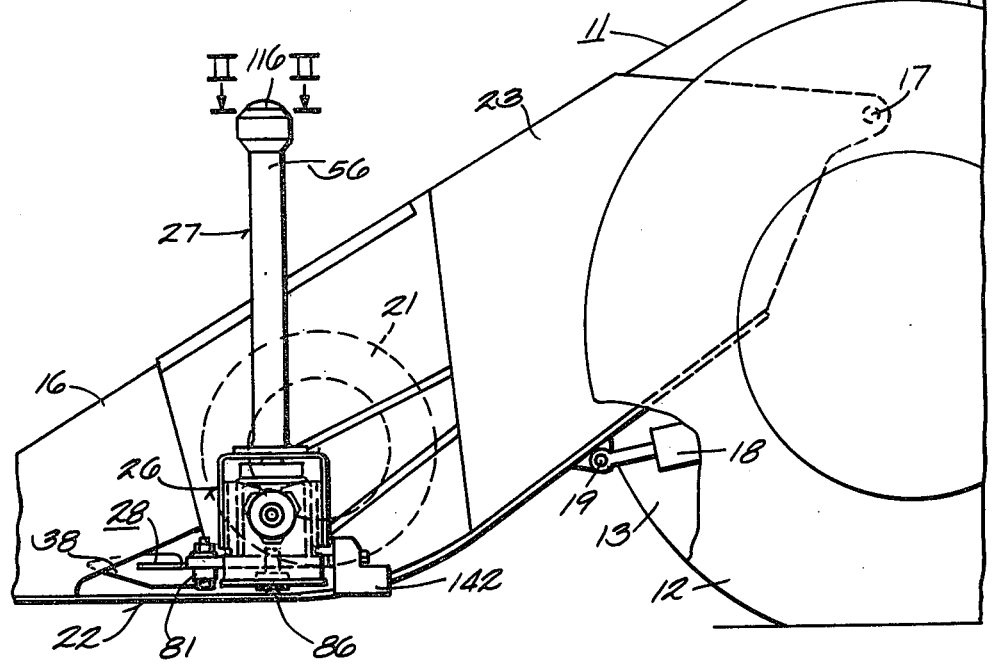
FIG. 1 is a side view of a harvester or combine.
Figure 5:
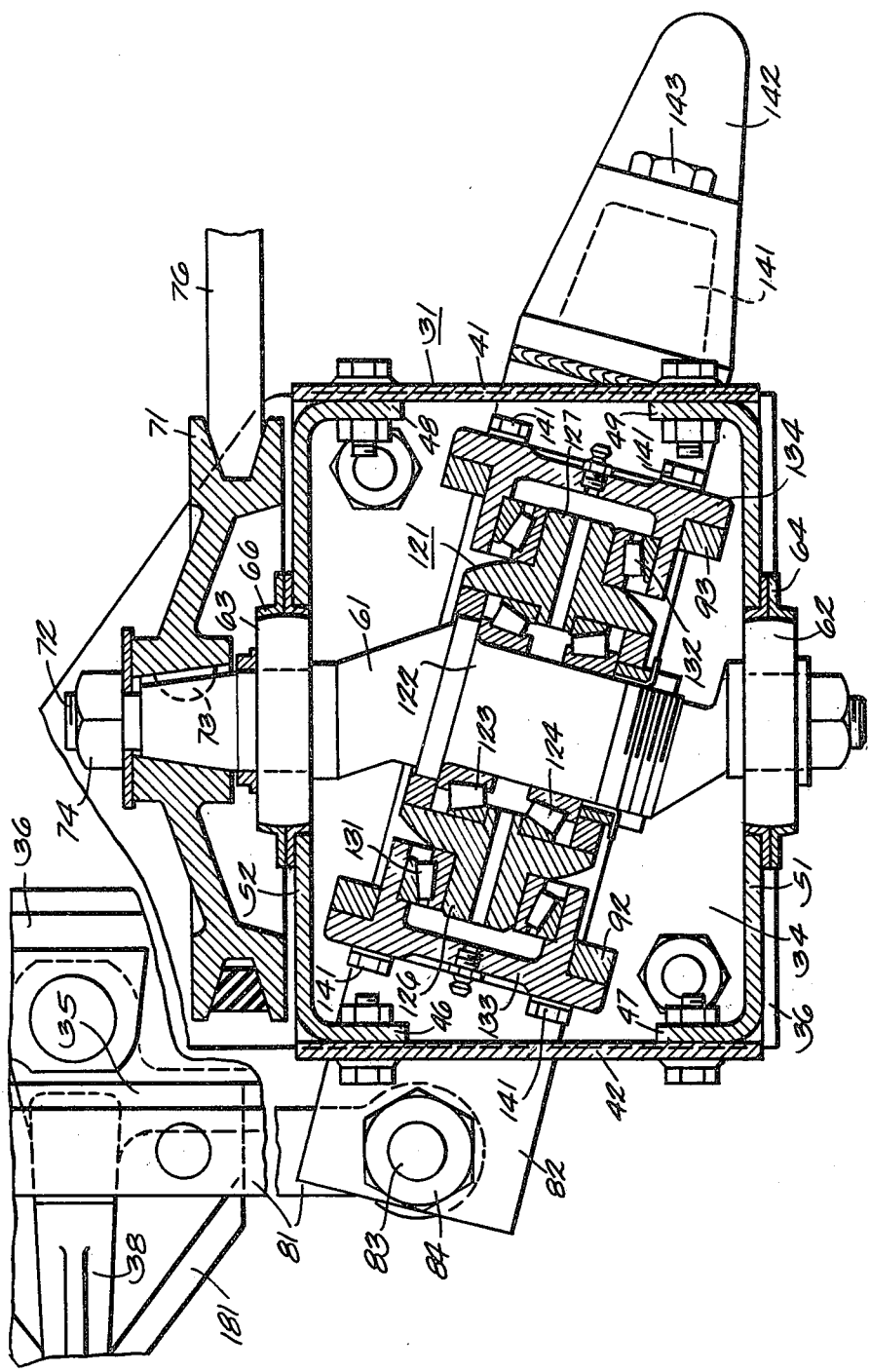
FIG. 5 is a view taken along the line V—V in FIG. 4.

Referring to FIG. 1, the combine 11, in which the present invention is incorporated, includes a pair of front drive wheels 12, 13, an operator's cab 14 and a header 16 pivotally connected to the main frame of the combine on a transverse pivot axis 17 for vertical swinging movement in response to expansion and contraction of a hydraulic jack 18 pivotally connected by a transverse pivot pin 19 to the bottom part of the header 16. The header 16 includes a transverse auger 21 which moves the material cut by a crop cutting mechanism 22 laterally toward the central part of the header where it is conveyed upwardly and rearwardly through a feeder portion 23 of the header to the threshing section of the combine. The crop cutting mechanism 22 includes a wobble drive mechanism 26 and a torsion bar device 27 which are interconnected to one another and to the horizontally reciprocating sickle 28 of the cutting mechanism 22 to provide a frequency of operation in the neighborhood of the resonant frequency. As shown in FIG. 5, the sickle includes a sickle bar 81 and knife elements 181.

Figure 3:
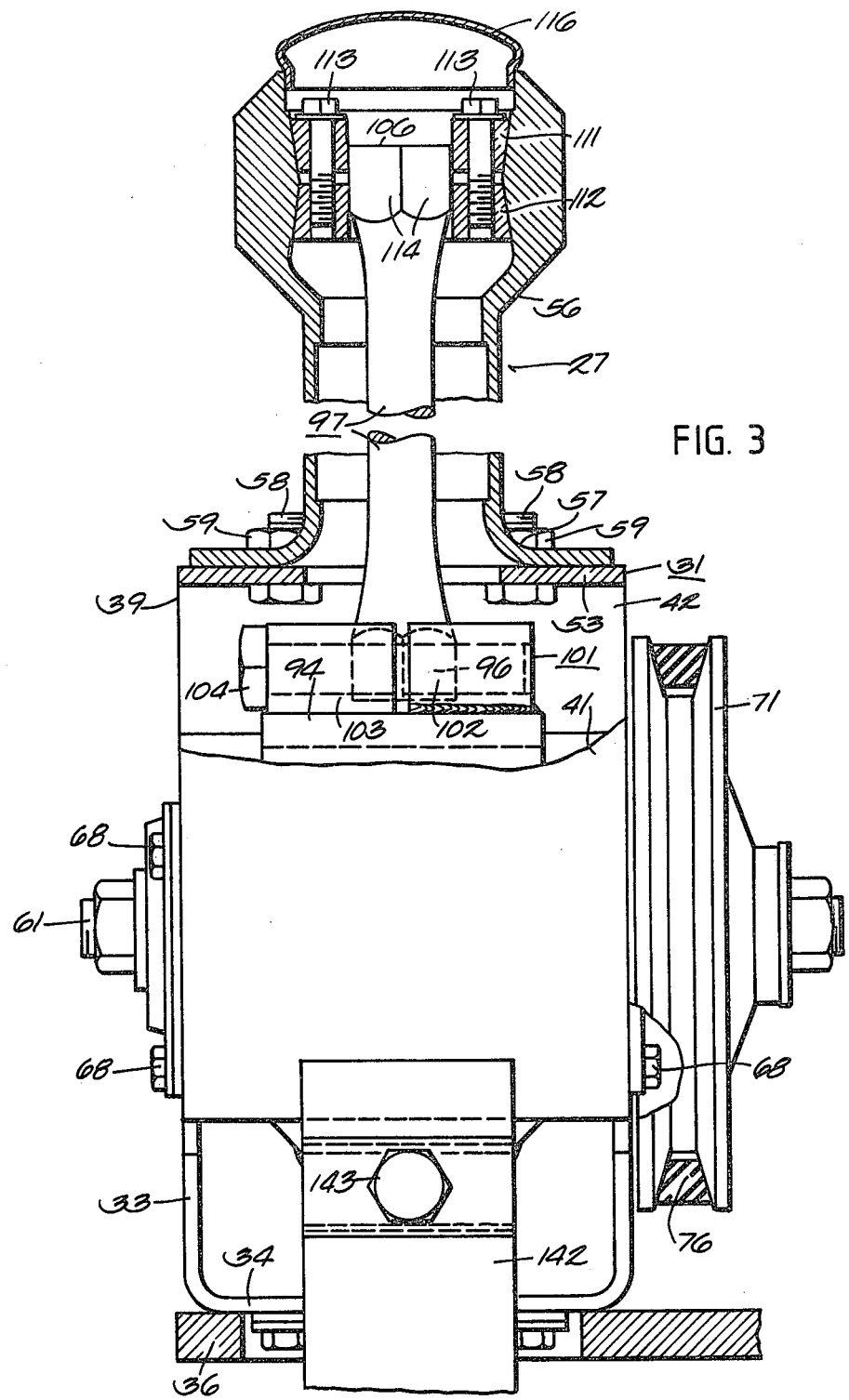
FIG. 3 is a rear view of the wobble drive and torsion bar mechanisms of the present invention with parts broken away for illustration purposes.
Figure 4:
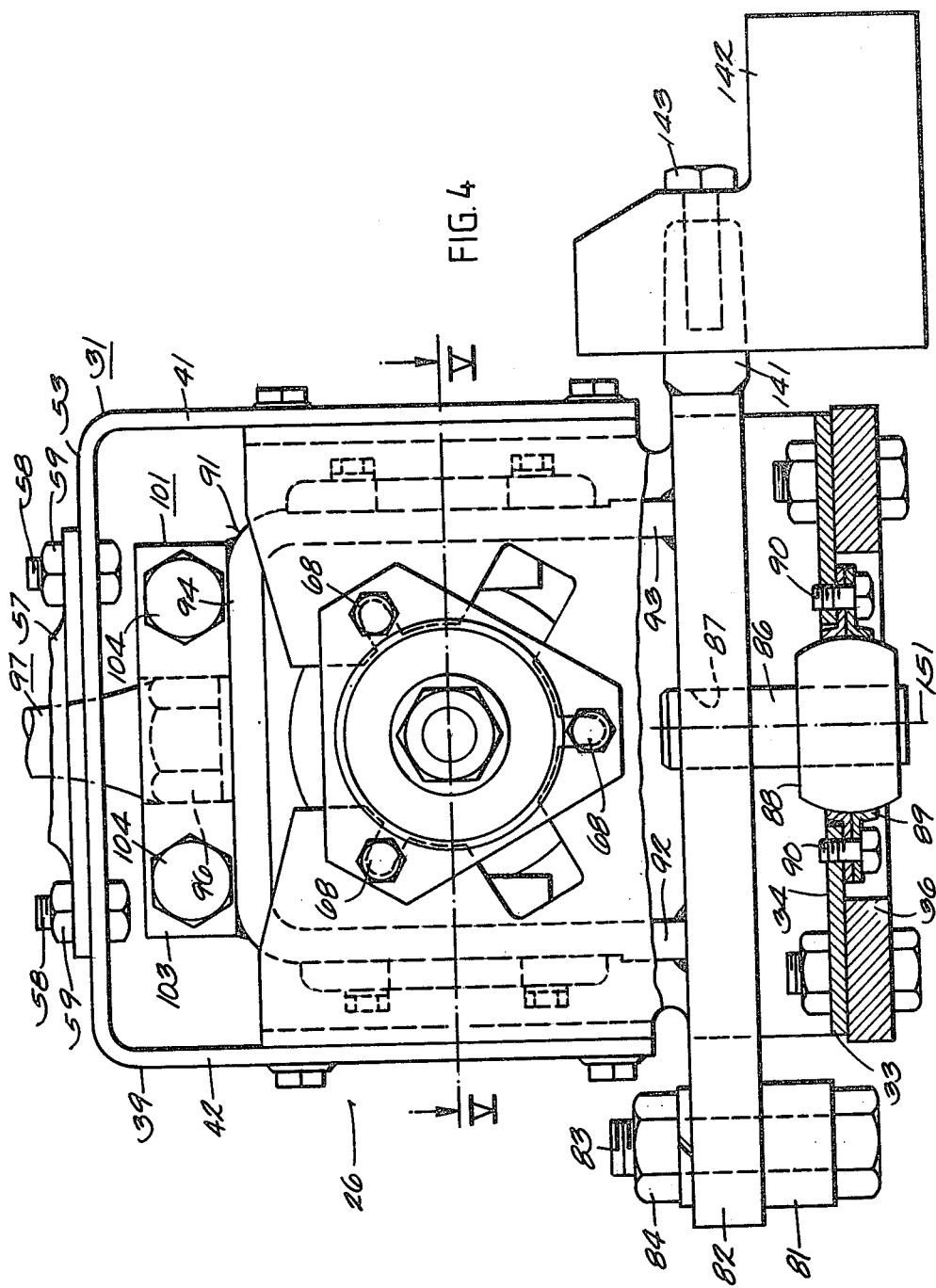
FIG. 4 is a side view of the lower portion of the mechanism illustrated in FIG. 3 with parts broken away for illustration purposes.

Referring also to FIGS. 3, 4 and 5, a wobble drive support or housing 31 includes a lower portion 33 formed from a metal plate which has a flat bottom wall 34 bolted to a stationary frame member 36, to which the cutter bar 35 and sickle guards 38 are connected. The housing 31 also includes an upper portion 39 formed from a flat plate having downwardly extending sides 41, 42 bolted to flanges 46, 47, 48, 49 of the upright sidewalls 51, 52 of the lower portion 33. A top wall 53 of the upper portion 39 of support 31 supports a torsion bar mounting tube 56 by virtue of its flared base portion 57 being bolted thereto by bolts 58 and nuts 59.

As shown in FIG. 5, a crankshaft 61 has its opposite ends mounted in bearings 62 and 63 secured by bearing mounts 64, 66 to the sidewalls 51 and 52 of the housing 31 by cap screws 68. The crankshaft 61 is rotated by a V-belt pulley 71 secured to the laterally inner end of the crankshaft 61 by a key 73 and a nut 74 engaging the threaded end 72. An endless V-belt 76 drivingly engages the pulley 71 and is driven by the combine engine (not shown) through a suitable drive train (not shown). The reciprocating sickle bar 81 of the sickle 28 is pivotally connected to an oscillating drive lever 82 by a suitable pivot bolt 83 and nut 84. An upright or vertical pivot pin 86 is press fit into a bore 87 in an intermediate portion of the lever 82. The lower end of the pin 86 is journalled in a bearing 88 supported by bearing mounts 89 secured to the stationary lower housing wall 34 by cap screws 90. An upright, inverted, U-shaped part 91 of the horizontally extending lever 82 has its downwardly extending vertical walls or legs 92 and 93 welded to the lever 82 at diametrically opposite sides of the upright pivot pin 86.

Figure 2:
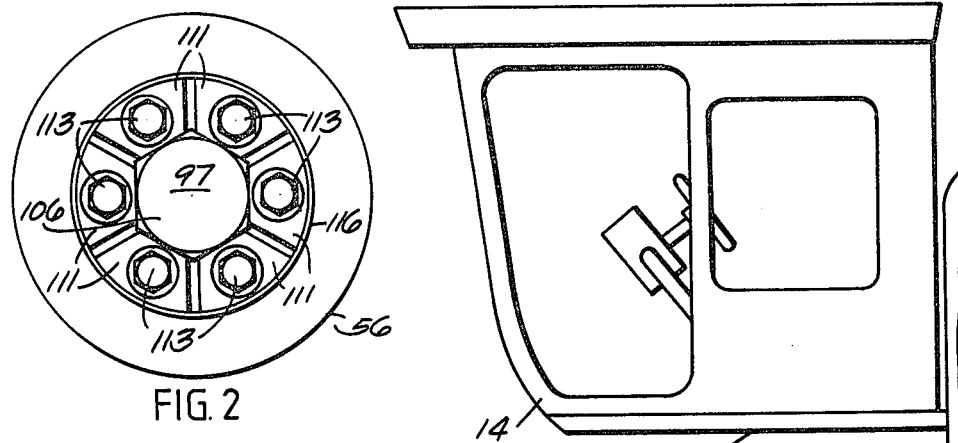
FIG. 2 is a view taken along the line II—II in FIG. 1.

The horizontally disposed upper wall 94 of the U-shaped part 91 is rigidly secured to a hex-shaped lower end 96 of an upright or vertical torsion bar 97 of the torsion device 27. The rigid connection between the rod-like torsion bar 97 and the upper wall 94 of the lever 82 is effected by a split clamp 101 comprising a first part 102 welded to the upper wall 94 and a releasable part 103 secured to part 102 by cap screws 104. The hex-shaped upper end 106 of the torsion bar 96 is rigidly secured to the upper end of the torsion bar support tube 56 by a wedging clamp arrangement including six pairs of clamping parts 111, 112 held together by cap screws 113. As shown in FIGS. 2 and 3, the radially inner sides of the clamping parts 111, 112 bear against the six faces 114 of the hex-shaped upper end 106 of the torsion bar 97 to rigidly secure the upper end of the torsion bar 97 against rotary movement. The radially outer surfaces of the clamping parts 111, 112 are curved to be complimentary to the conical surfaces 116, 117 of the tube 56, thus permitting accurate indexing of the torsion bar 97 to the sickle 28 so the torsion bar is not subjected to torsional loading when the sickle is at the midpoint of its reciprocation. Thus, it is seen that the torsion bar is releasably but rigidly secured at its opposite ends and may, if necessary, be removed for inspection or replacement. The tube 56 encompasses the torsion bar 97 and thus protects it from being accidentally damaged. A removable cap 116 on the upper end of the tube 56, protects the clamping area from rain and other foreign material.

As shown in FIG. 5, a trunnion ring 121 is journalled on a canted portion 122 of the drive shaft 61 by a pair of antifriction bearings 123, 124. The trunnions or trunnion portions 126, 127 of the trunnion ring 122 are journalled in the vertical legs 92, 93 of U-shaped member 91 by bearings 131, 132 carried in bearing mounts 133, 134 secured to the vertically disposed legs 92, 93 by cap screws 141. When the wobble drive shaft 61 is driven, the trunnion ring 121 becomes an oscillating output member causing the lever 82 to oscillate about oscillating axis 151. The rear end of the oscillating lever 82 includes a tapered end part 141 to which a suitable counterweight 142 may be releasably secured by a cap screw 143. The size of the counterweight can be changed to match different length sickles.

Figure 6:
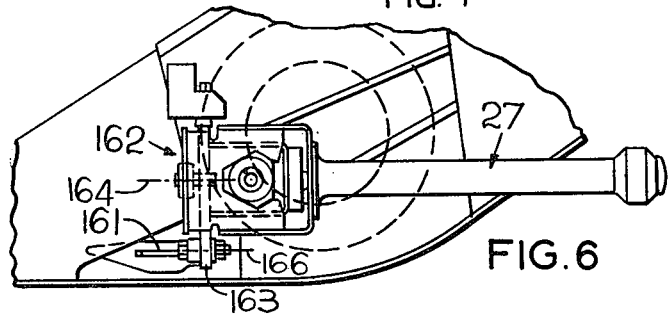
FIG. 6 is a partial side view showing an alternate construction of the present invention.

As shown in FIG. 6, a sickle 161 may be driven by a wobble drive mechanism 162 having its output lever 163 disposed vertically and oscillating about a generally horizontal axis 164 which is parallel to the axis 166 of the lever's pivot connection with the sickle 161. In this alternative arrangement, the torsion bar device 27 is disposed longitudinally and may be preferred over the vertical disposition because it provides a reduced header overhang moment and a better appearance.

OPERATION

Rotation of the shaft 61 causes the lever 82 to oscillate about the upright or vertical axis 151 of pivot pin 86 to impart a reciprocating motion to the sickle bar 81 which carries standard cutting elements or knives 181. As shown in FIG. 3, the torsion bar 97 is in a neutral condition, that is, it is not subjected to a twisting force when the lever is in a fore and aft position, which is the midpoint of the sickle stroke. However, when the operating lever 82 is rotated to the position shown in FIG. 5, the torsion bar 97 is rotated at its lower end (by virtue of its rigid connection to the lever 82) thereby storing energy in the torsion bar. The energy stored by the torsion bar 97 at the end of the stroke of the sickle bar 81 is released to the sickle bar 81 as the sickle bar begins a new stroke, thus contributing part of the force needed to cut the crop. By selecting a torsion bar with an appropriate spring rate, the resonant frequency of the sickle and its drive will fall within the reciprocating frequency range in which the sickle normally operates during various crop cutting operations. By storing the energy associated with movement of the reciprocating sickle (and oscillation of the lever and the trunnion ring) to the end of its stroke and releasing the energy as the sickle moves from the end of the stroke to the center of the stroke, the input drive torque needed to reciprocate the sickle 28 is drastically reduced. The reduction in input torque and consequent reduction in forces in the sickle drive train is expected to extend the useful life of the mowing device.

Theoretically in a spring coupled, resonant system with no dampening the power required to drive the system approaches zero as resonance is approached. However, dampening exists in a reciprocating sickle mechanism due to friction between contacting parts which move relative to one another. Thus, instead of the power decreasing abruptly to zero at resonant frequency, the power requirement will decrease gradually as the resonant frequency is approached. Thus, the benefits of the spring coupled drive for a reciprocating sickle, which are available at resonant frequency, are also substantially available near resonant frequency. In practice, it has been found that substantial benefits are available when operating the drive through the range of frequencies encountered in cutting various crops under various conditions. For instance, in systems which vary cutter speed with engine speed, one may experience a slowing in reciprocation of the sickle when the engine is loaded and an increase in reciprocation frequency when at light or no load conditions.

The embodiments of the invention in which an exclusive property or privilege is claimed are defined as follows:

1. A drive mechanism for reciprocating a sickle of a harvester comprising
   a lever extending generally transverse to the direction of reciprocation of said, sickle,
   means pivotally supporting said lever for movement about an oscillation axis generally transverse to said direction of reciprocation of said sickle,
   means adjacent one end of said lever connecting said lever to said sickle,
   power means operatively connected to said sickle causing reciprocation thereof and oscillating movement of said lever about said oscillation axis,
   an elongated torsion bar in alignment with said oscillation axis,
   means rigidly securing one end of said torsion bar to said lever for pivotal movement therewith about said oscillation axis,
   means nonrotatably supporting the other end of said torsion bar, said torsion bar storing energy when its said one end is rotated with said lever about said oscillation axis as the sickle is moved from the midpoint of its stroke to the end of its stroke and releasing its stored energy as the sickle returns from the end of its stroke to the midpoint of its stroke.

2. The drive mechanism of claim 1 wherein said torsion bar has a predetermined spring rate so the resonant frequency of the sickle and its oscillating driving mechanism falls within the operating range of frequencies of reciprocation of the sickle during a crop cutting operation.

3. The drive mechanism of claim 1 wherein said lever includes a pair of spaced legs at diametrically opposite sides of said axis and a bridging wall interconnecting to said legs, said one end of said torsion bar being nonrotatably secured to said bridging wall and wherein said power means includes a wobble drive mechanism having a drive shaft with a canted portion journalled to a trunnion ring which in turn is pivotally connected to said legs of said lever.

4. The drive mechanism of claim 3 wherein said wobble drive includes a support structure secured to said harvester which pivotally supports said lever for movement about said oscillation axis and rotatably supports said crank shaft, and further comprising a cylindrical torsion bar support tube encompassing said torsion bar, said tube having one end rigidly secured to said support structure and its other end rigidly secured to said other end of said torsion bar.

5. The drive mechanism of claim 1, 2, 3 or 4 wherein said lever includes a counterweight portion on the end thereof remote from said one end, said oscillation axis being intermediate said counterweight portion and said one end of said lever.

6. A crop cutting device for a harvester comprising:
   a support,
   an elongated sickle horizontally reciprocable in its direction of elongation,
   drive means for reciprocating said sickle,
   a lever extending generally transverse to said sickle,
   means connecting one end of said lever to said sickle,
   means pivotally connecting said lever to said support for movement about an oscillation axis spaced from said sickle,
   an elongated torsion bar of rod-like configuration and means nonrotatably securing opposite ends of said torsion bar to said support and lever, respectively, whereby the axis of said torsion bar lies on said oscillation axis and the end of said torsion bar secured to said lever oscillates with the latter about said oscillation axis during a crop cutting operation the resonant frequency of said sickle and oscillating elements connected thereto falling within the normal range of operating frequencies of reciprocation of said sickle during a crop cutting operation.

7. The cutting device of claim 6 wherein said torsion bar is coaxial with said oscillation axis.

8. The cutting device of claim 7 wherein said drive means is operatively connected to said lever to cause the latter to oscillate about said oscillation axis.

9. The crop cutting device of claim 8 wherein said drive means includes a wobble drive mechanism having a rotary input shaft and an oscillating output member, said oscillating output member being secured to said lever so as to oscillate coaxially therewith.

10. A drive mechanism for reciprocating a sickle comprising:
    a support,
    a wobble drive apparatus including
      a crankshaft rotatably mounted on a first axis on said support having a power input end portion and a canted output portion,
      a driving element secured to said power input end portion of said crankshaft,
      a trunnion ring rotatably mounted on said canted portion of said crankshaft presenting trunnions on diametrically opposite sides of said canted portion, and
      an oscillatable output element pivotally connected to said trunnions and pivotally connected to said support for oscillating movement relative thereto about a second axis transverse to said first axis, said output element being adapted for connection to a sickle to effect reciprocation thereof, and
    a torsion bar aligned with said second axis having its opposite ends nonrotatably connected to said output element and support, respectively.

11. The drive mechanism of claim 10 wherein said support includes a tube encompassing said torsion bar and rigidly connected at one end to one end of said torsion bar.

12. The drive mechanism of claims 10 or 11 wherein said output element includes a lever having one end adapted for connection in driving relation to said sickle.

13. The drive mechanism of claims 10 or 11 wherein said output element includes a lever having one end adapted for connection in driving relation to said sickle and a counterweight portion on its opposite end.

14. The drive mechanism of claims 1, 2, 3, 4, 6, 7, 8, 9, 10 or 11 wherein said torsion bar is in a generally upright position.

15. The drive mechanism of claims 1, 2, 3, 4, 6, 7, 8, 9, 10 or 11 wherein said torsion bar is longitudinally disposed.

* * * * *